United States Patent
Ben Zur et al.

(10) Patent No.: US 11,500,764 B2
(45) Date of Patent: Nov. 15, 2022

(54) HUMAN INTERACTIONS WITH ARTIFICIAL INTELLIGENCE (AI)-BASED TESTING TOOL

(71) Applicant: MICRO FOCUS LLC, Santa Clara, CA (US)

(72) Inventors: Tsachi Ben Zur, Yehud (IL); Dror Saaroni, Yehud (IL); Eyal Luzon, Yehud (IL); Gil Nakache, Yehud (IL); Motti Lanzkron, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/085,547

(22) Filed: Oct. 30, 2020

(65) Prior Publication Data

US 2022/0138086 A1 May 5, 2022

(51) Int. Cl.
*G06F 11/36* (2006.01)
(52) U.S. Cl.
CPC ...... *G06F 11/3696* (2013.01); *G06F 11/3664* (2013.01); *G06F 11/3688* (2013.01)
(58) Field of Classification Search
CPC ............................................. G06F 11/36–3696
See application file for complete search history.

(56) References Cited

U.S. PATENT DOCUMENTS

| | | | | |
|---|---|---|---|---|
| 5,511,185 A * | 4/1996 | Weinbaum | ............ | G06F 11/263 714/38.12 |
| 8,849,047 B2 * | 9/2014 | Chao | ..................... | G06F 16/583 382/232 |
| 10,409,712 B2 * | 9/2019 | Dwarakanath | ...... | G06F 11/3664 |
| 10,769,503 B1 * | 9/2020 | Buhler | .................... | G06V 20/30 |
| 10,901,763 B2 * | 1/2021 | Li | ......................... | G06T 7/0002 |
| 2014/0016872 A1 * | 1/2014 | Chao | ...................... | G06F 16/51 382/218 |
| 2018/0189170 A1 * | 7/2018 | Dwarakanath | ......... | G06K 9/344 |
| 2020/0026536 A1 * | 1/2020 | Li | ......................... | G06T 7/0002 |
| 2020/0235935 A1 * | 7/2020 | Cerna, Jr. | ............. | H04L 9/3236 |

OTHER PUBLICATIONS

Colwell, et al.; Introducing NEO, AI Driven Test Automation; https://www.tricentis.com/resources/introducing-neo-ai-driven-test-automation/; Feb. 3, 2021; 6 pages.
Youtube; Can We Make Our Automation Just As Adaptable; https://www.youtube.com/watch?v=ujCd9lQOZ-w; Aug. 27, 2020, p. 1.

* cited by examiner

*Primary Examiner* — Todd Aguilera
(74) *Attorney, Agent, or Firm* — Sheridan Ross P.C.

(57) ABSTRACT

Embodiments of the disclosure provide systems and methods for performing functional testing on an application using artificial intelligence. According to one embodiment, a method for performing functional testing on an Application Under Test (AUT) can comprise maintaining, by a processor of an edge computing device, a model comprising a script defining one or more automatic tests for the AUT and trained data identifying objects of a user interface of the AUT. One or more tests can be executed on the AUT by the processor of the edge computing device based on the script and the trained data identifying the objects of the user interface of the AUT. Results of executing the one or more tests on the AUT can be provided by the processor of the edge computing device.

17 Claims, 6 Drawing Sheets

HUMAN INTERACTIONS WITH ARTIFICIAL INTELLIGENCE (AI)-BASED TESTING TOOL

FIELD OF THE DISCLOSURE

Embodiments of the present disclosure relate generally to methods and systems for functional testing of an application and more particularly to use of artificial intelligence in automated functional testing of an application.

BACKGROUND

The development lifecycle of a software product is an iterative process of development and testing. To find defects in the product as early as possible, automatic functional testing should be implemented. Automated functional testing traditionally employs an automation script which consists of operations performed on the Application Under Test (AUT). These operations are executed on the AUT at a user level, e.g., as Graphical User interface (GUI) testing, and normally have two parts: identifying the requested control in the GUI of the application; and performing the desired operation on the control. Traditional control identification processes are based on the underlying technological properties of the object. These properties are expected to have certain values in order to properly identify the object. However, as technologies change and as properties of the objects change, traditional tests fail without significant manual intervention, e.g., rewrites of test scripts etc. Hence, there is a need for improved methods and systems for automatic functional testing of applications.

BRIEF SUMMARY

Embodiments of the disclosure provide systems and methods for performing functional testing on an application. According to one embodiment, a method for performing functional testing on an Application Under Test (AUT) can comprise maintaining, by a processor of an edge computing device, an Artificial Intelligence (AI)-based model comprising a script defining one or more automatic tests for the AUT and trained data identifying objects of a user interface of the AUT. Maintaining the model can comprise, in some cases, training the trained data using a development mock-up of the user interface of the AUT. One or more tests can be executed on the AUT by the processor of the edge computing device based on the script and the trained data identifying the objects of the user interface of the AUT. Results of executing the one or more tests on the AUT can be provided by the processor of the edge computing device. In some cases, the model can be updated by the processor of the edge computing device based on the results of executing the one or more tests on the AUT.

Executing the one or more tests on the AUT can comprise performing a two-level caching processes on the user interface of the AUT. The two-level caching process can comprise receiving an image of the user interface of the AUT and hashing the received image using a combination hash. The combination hash can comprise a hash of the image using a first hashing function and a hash of a description of the image using a second hashing functions. The description of the image can be hashed using the second hashing function. The received image can be clustered with one or more clusters in a cache based on one or more areas of interest in the received image and a hash of each of the one or more areas of interest in the image using the second hashing function.

Additionally, or alternatively, executing the one or more tests on the AUT can comprise determining, by the processor of the edge computing device, whether the user interface of the AUT is currently changing. In response to determining the user interface of the AUT is currently changing, the processor of the edge computing device can wait before proceeding with execution of the one or more tests on the AUT. In response to determining the user interface of the AUT is not currently changing, the processor of the edge computing device can proceed with execution of the one or more tests on the AUT. In some cases, executing the one or more tests on the AUT can additionally, or alternatively comprise determining, by the processor of the edge computing device, whether an object identified by the model is present in the user interface of the AUT based on the trained data identifying objects of the user interface of the AUT. In response to determining the object identified by the model is present in the user interface of the AUT, the processor of the edge computing device can wait before proceeding with execution of the one or more tests on the AUT. In response to determining the object identified by the model is not present in the user interface of the AUT, the processor of the edge computing device can proceed with execution of the one or more tests on the AUT. Additionally, or alternatively, executing the one or more tests on the AUT can comprise determining, by the processor of the edge computing device, whether text of the user interface of the AUT indicates waiting based on the trained data identifying objects of the user interface of the AUT. In response to determining the text of the user interface of the AUT indicates waiting, the processor of the edge computing device can wait before proceeding with execution of the one or more tests on the AUT. In response to determining the text of the user interface of the AUT does not indicate waiting, the processor of the edge computing device can proceed with execution of the one or more tests on the AUT.

According to another embodiment, a computing device can comprise a processor and a memory coupled with and readable by the processor. The memory can store therein a set of instructions which, when executed by the processor, causes the processor to perform functional testing on an Application Under Test (AUT) by maintaining an Artificial Intelligence (AI)-based model comprising a script defining one or more automatic tests for the AUT and trained data identifying objects of a user interface of the AUT. In some cases, maintaining the model can comprise training the trained data using a development mock-up of the user interface of the AUT. The instructions can further cause the processor to execute one or more tests can be on the AUT based on the script and the trained data identifying the objects of the user interface of the AUT and provide results of executing the one or more tests on the AUT. In some cases, the instructions can also cause the processor to update the model based on the results of executing the one or more tests on the AUT.

In some cases, executing the one or more tests on the AUT can comprise performing a two-level caching processes on the user interface of the AUT. The two-level caching process can comprise receiving an image of the user interface of the AUT and hashing the received image using a combination hash. The combination hash can comprise a hash of the image using a first hashing function and a hash of a description of the image using a second hashing functions. The description of the image can be hashed using the second hashing function. The received image can be clustered with one or more clusters in a cache based on one or more areas of interest in the received image and a hash of each of the one or more areas of interest in the image using the second hashing function.

Additionally, or alternatively, executing the one or more tests on the AUT can comprise determining whether the user interface of the AUT is currently changing and in response to determining the user interface of the AUT is currently changing, waiting before proceeding with execution of the one or more tests on the AUT. In response to determining the user interface of the AUT is not currently changing execution of the one or more tests on the AUT can proceed. In some cases, executing the one or more tests on the AUT can comprise determining, whether an object identified by the model is present in the user interface of the AUT based on the trained data identifying objects of the user interface of the AUT and in response to determining the object identified by the model is present in the user interface of the AUT, waiting before proceeding with execution of the one or more tests on the AUT. In response to determining the object identified by the model is not present in the user interface of the AUT, execution of the one or more tests on the AUT can proceed. Additionally, or alternatively, executing the one or more tests on the AUT can comprise determining whether text of the user interface of the AUT indicates waiting based on the trained data identifying objects of the user interface of the AUT and in response to determining the text of the user interface of the AUT indicates waiting, waiting before proceeding with execution of the one or more tests on the AUT. In response to determining the text of the user interface of the AUT does not indicate waiting, execution of the one or more tests on the AUT can proceed.

According to yet another embodiment, a non-transitory, computer-readable medium can comprise a set of instructions stored therein which, when executed by a processor, causes the processor to perform functional testing on an Application Under Test (AUT) by maintaining an Artificial Intelligence (AI)-based model comprising a script defining one or more automatic tests for the AUT and trained data identifying objects of a user interface of the AUT, executing one or more tests on the AUT based on the script and the trained data identifying the objects of the user interface of the AUT, and providing results of executing the one or more tests on the AUT. In some cases, the instructions can further cause the processor to update the model based on the results of executing the one or more tests on the AUT.

Executing the one or more tests on the AUT can comprise performing a two-level caching processes on the user interface of the AUT. The two-level caching process can comprise receiving an image of the user interface of the AUT and hashing the received image using a combination hash. The combination hash can comprise a hash of the image using a first hashing function and a hash of a description of the image using a second hashing functions. The description of the image can be hashed using the second hashing function. The received image can be clustered with one or more clusters in a cache based on one or more areas of interest in the received image and a hash of each of the one or more areas of interest in the image using the second hashing function.

Additionally, or alternatively, executing the one or more tests on the AUT can comprise any one or more of determining whether the user interface of the AUT is currently changing, determining, whether an object identified by the model is present in the user interface of the AUT based on the trained data identifying objects of the user interface of the AUT, and/or determining whether text of the user interface of the AUT indicates waiting based on the trained data identifying objects of the user interface of the AUT. In response to determining the user interface of the AUT is currently changing, determining the object identified by the model is present in the user interface of the AUT, or determining the text of the user interface of the AUT indicates waiting, execution of the one or more tests on the AUT can wait. In response to determining the user interface of the AUT is not currently changing, determining the object identified by the model is not present in the user interface of the AUT, or determining the text of the user interface of the AUT does not indicate waiting, execution of the one or more tests on the AUT can proceed.

Figure 1:
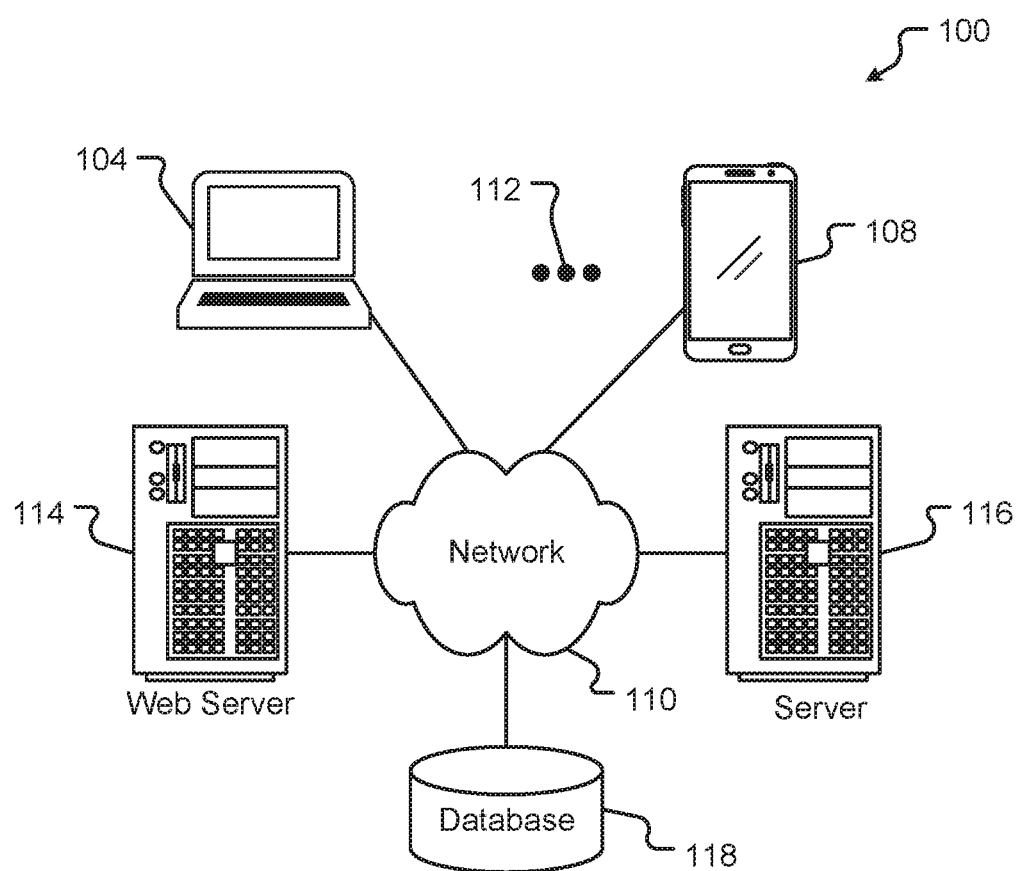
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, and 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, JAVA servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
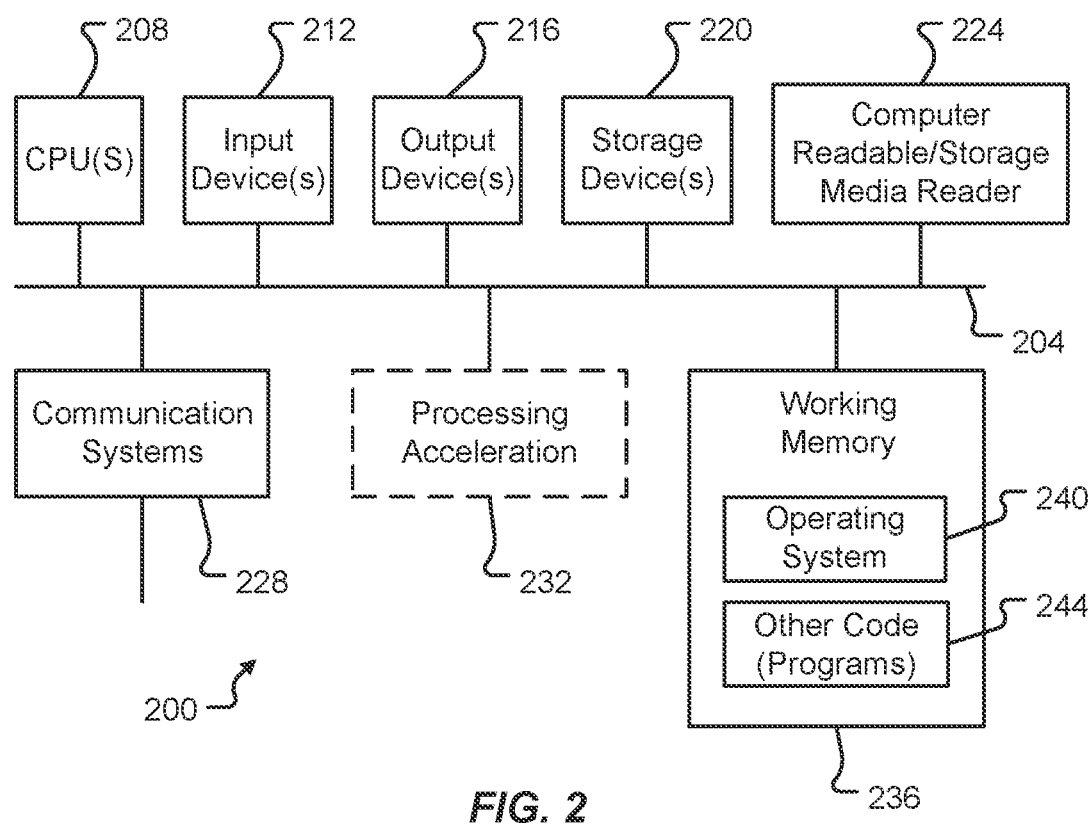
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments of the present disclosure are directed to performing functional testing on an application such as an application that may be implemented on any one or more of the servers and/or computing devices described above. As will be described in detail below, embodiments provide for using artificial intelligence to train tests and data used when executing automated tests on an Application Under Test (AUT). Embodiments described herein can be operate on-premise, where images and other results can stay on-premises whereas other approaches require sending the images or results to a remotely-located server. Embodiments described herein also provide a multiclass solution which can evaluate and understand the meaning of the elements on a user interface page rather than focusing on specific expected elements such as certain buttons, form controls, text, etc. Such embodiments can use one or more models, both generic and dedicated, to identify the elements on the user interface and execute tests accordingly. Embodiments further provide any number of additional capabilities including, but not limited to, recording and playback of tests, inspection, identification while spying, Natural Language Processing (NLP)-based tools, etc.

Figure 3:
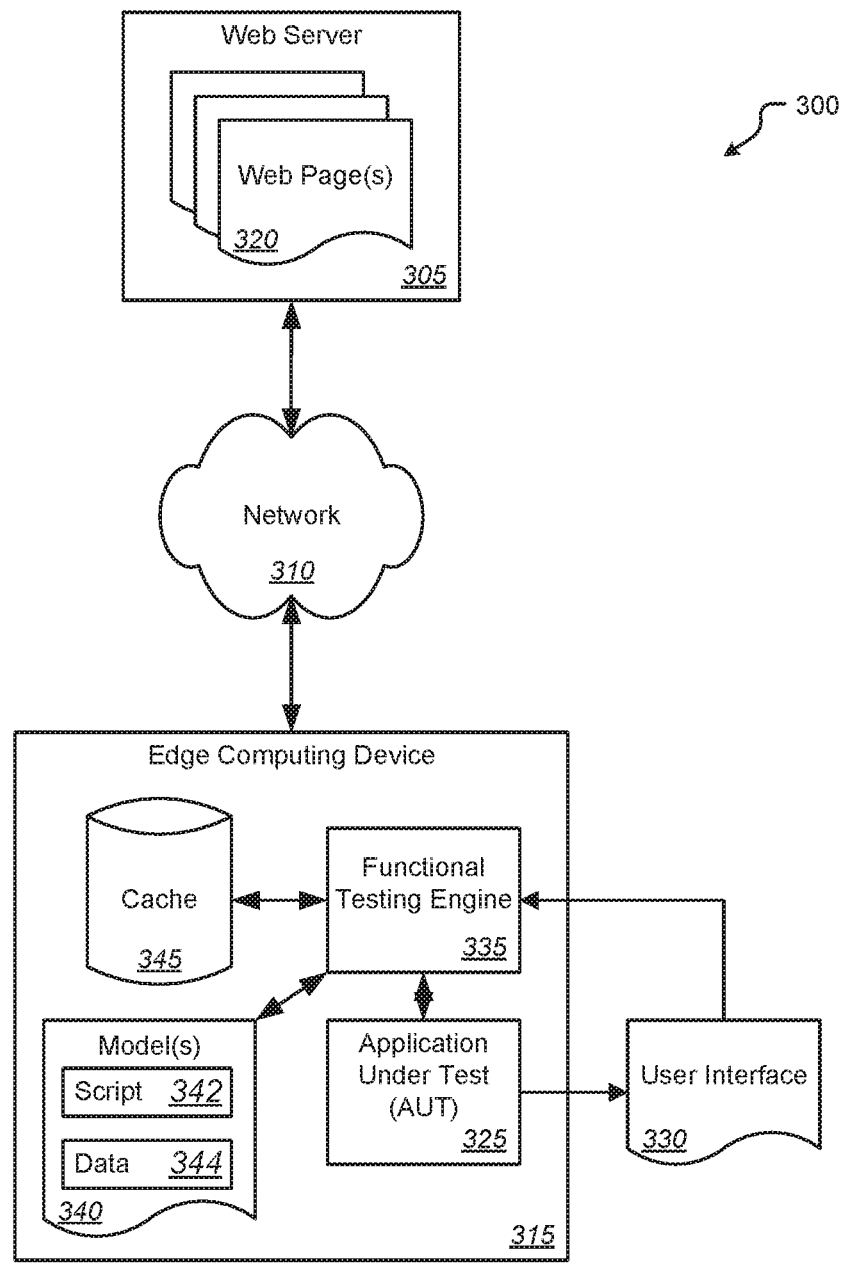
FIG. 3 is a block diagram illustrating an exemplary environment for implementing functional testing according to one embodiment of the present disclosure.

FIG. 3 is a block diagram illustrating an exemplary environment for implementing functional testing according to one embodiment of the present disclosure. As illustrated in this example, the environment 300 can include a web server 305 such as any one or more of the servers described above. The web server 305 can be coupled with a communications network 310 such as any one or more of the wired and/or wireless local and/or wide area networks described above. The environment 300 can also include an edge computing device 315 such as any of the computing devices described above and also coupled with the communications network 310. Generally speaking, and as introduced above, the web server 305 can provide one or more web pages 320 to the edge computing device 315 and/or provide other functions and or service as known in the art.

According to embodiments described herein, the edge computing device 315 can be adapted to perform functional testing on an application, i.e., an Application Under Test (AUT) 325. During normal operation, as well as under test, the AUT 325 can provide a user interface 330 comprising various graphical and/or textual elements. A functional testing engine 335 can execute one or more functional tests on the AUT 325 and user interface 330 of the AUT 325, i.e., by navigating the user interface 330, selecting various elements therein, and verifying functions of the AUT 325 associated with the selected elements.

Generally speaking, the functional testing engine 335 can utilize Artificial Intelligence (AI) to identify objects in the user interface 330 of the AUT 325 based on their graphical appearance, like a human tester would, rather than their underlying technological properties. To do so, the functional testing engine 335 can use a model 340 comprising a set of trained data 344 identifying object of the user interface 330 and a script 342. Once objects on a particular screen or page in the user interface 330 have been identified by the AI processes of the functional testing engine 335 based on the trained data 344 of the model 340 as described herein, the script 342 that automatically tests the AUT based on the object identification can be executed by the functional testing engine 335. The AI used by the functional testing engine 335 to graphically/visually identify objects may be trained on data that graphically/visually identifies other objects, not necessarily those objects in the user interface 330 of the AUT 325. For instance, a login button on one screen of one application (e.g., a website) often has similar graphical characteristics as a login button for some other application (e.g., a mobile application). That is, the visual commonality between objects to generate the trained data 344 of the model 340 and AI of the functional testing engine can be used for the purposes of automated functional testing of the AUT 325.

According to one embodiment, the edge computing device can also comprise a cache 345 maintained by the functional testing engine 335, Generally speaking, the functional testing engine 335 can save in the cache images of the user interface 330 of the AUT 325 during testing with similar images saved in clusters within the cache 345.

However, using a strict equivalence for this clustering and caching may cause very few if any cache-hits since minor uninteresting differences will produce different hash values. For example, images of the user interface can differ in such trivial aspects as the current time displayed, the WiFi up or down arrow being lit, the battery level, the reception strength, etc. On the other hand, if a lax equivalence is used, images that have semantic differences may cause a cache hit thus returning the wrong result. In general, false positives may be more harmful than false negatives since a false negative can cause some performance degradation while a false positive can cause unmatching results which can cause the program to fail.

Generally, differences in the area of interest in the image of the user interface 330 are much more important than changes in other areas. According to one embodiment, the functional testing engine 335 can therefore use a two-level method of caching. First, the functional testing engine 335 can cluster similar images using a permissive hashing mechanism, i.e., a hash function that produces results in which matches between hashed data can be found when the data is less than an exact match. Then, after the result is obtained, the functional testing engine 335 can add the result according to a strict hashing, i.e., a hash function that produces results in which matches between hashed data can be found only when the data is an exact match or nearly exact match, of detected rectangle(s) within the image representing individual elements. For subsequent calls the functional testing engine 335 can consider the cached result a match if it is grouped by the permissive hashing into a cluster that contains a result for which the rectangles in the result strictly match the corresponding rectangles in the new image.

More specifically, the functional testing engine 335 can, given an image having a description, determine a cluster for the image according to a first level comprising a combination of a permissive hashing of the full image and a strict hashing of the description of the image and a second level comprising the strict image hashing of the regions of interest within the image (including their rectangles). Each cluster can contain a set of results, each result can be identifiable by a set of rectangles and strict hashes of the images of said rectangles within the user interface 330 of the AUT 325. The functional testing engine 335 can fetch a result from the cache 345 if all its rectangles' hashes match those of the input image. If only one result matches the input image, this can be considered a match. If no match is found, the functional testing engine 335 can create a set of strict hashes from the descriptions of the rectangles in the results and can insert this into the cluster for future calls. Unsuccessful matches need not be cached by the functional testing engine 335.

According to one embodiment, the functional testing engine 335 can determine when the AUT 325 is ready for the next step. For example, if the user interface 330 of the AUT 325 is changing, the functional testing engine 335 can wait until the screen stops repainting itself. The functional testing engine 335 can identify if the screen is changing by comparing frames of the user interface 330 display and identifying changes between frames. Additionally, or alternatively, the functional testing engine 335 can determine whether there is a progress bar, spinner, or other icon or other object appearing on the user interface 330. The functional testing engine 335 may additionally, or alternatively, be trained or instructed to wait for a predetermined amount of time or wait for a particular event or set of events to occur prior to performing a next analysis and classifying additional objects. In some cases, Optical Character Recognition (OCR) can be used by the functional testing engine 335 to identify and track words that appear on the user interface 330 like "wait . . . " and/or "processing" which implies that work is being done behind the scenes and expects the user or automation script to wait.

Since embodiments of the present disclosure utilize AI that is based on image analysis, a quality assurance engineer or developer can use images from an application mockup of the user interface 330 of the AUT 325 to initially create a test script. The initial test script may be created based on the images presented by the application mockup, but may then be applied by the functional testing engine 335 to the AUT 325. Although the mockup is not final and the AUT's 325 user interface 330 may not be exactly as the mockup, the meaning of the objects will be valid. The functional testing engine 335 focuses on the meaning of the objects and not on properties of the objects. This allows the identification to be valid for the mockup and the real application when the meaning of the object stays the same.

Figure 4:
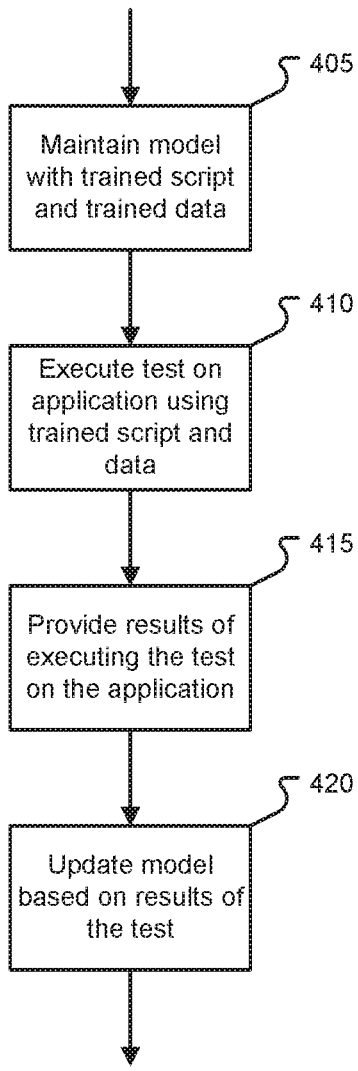
FIG. 4 is a flowchart illustrating, at a high level, an exemplary process for functional testing according to one embodiment of the present disclosure.

FIG. 4 is a flowchart illustrating, at a high level, an exemplary process for functional testing according to one embodiment of the present disclosure. As illustrated in this example, performing functional testing on an AUT 325 can comprise maintaining 405, by a processor of an edge computing device 315, a model 340 comprising a script 342 defining one or more automatic tests for the AUT 325 and trained data 344 identifying objects of a user interface 330 of the AUT 325. Maintaining 405 the model can comprise, in some cases, training the trained data using a development mock-up of the user interface 330 of the AUT 325. One or more tests can be executed 410 on the AUT 325 by the processor of the edge computing device 315 based on the script 342 and the trained data 344 identifying the objects of the user interface 330 of the AUT 325. Results of executing 410 the one or more tests on the AUT 325 can be provided 415 by the processor of the edge computing device 315, e.g., as a textual and/or graphical report, as a replay of the tests, etc. In some cases, the model 340 can be updated 420 by the processor of the edge computing device 315 by applying various machine learning techniques as known in the art and based on the results of executing 410 the one or more tests on the AUT 325.

Figure 5:
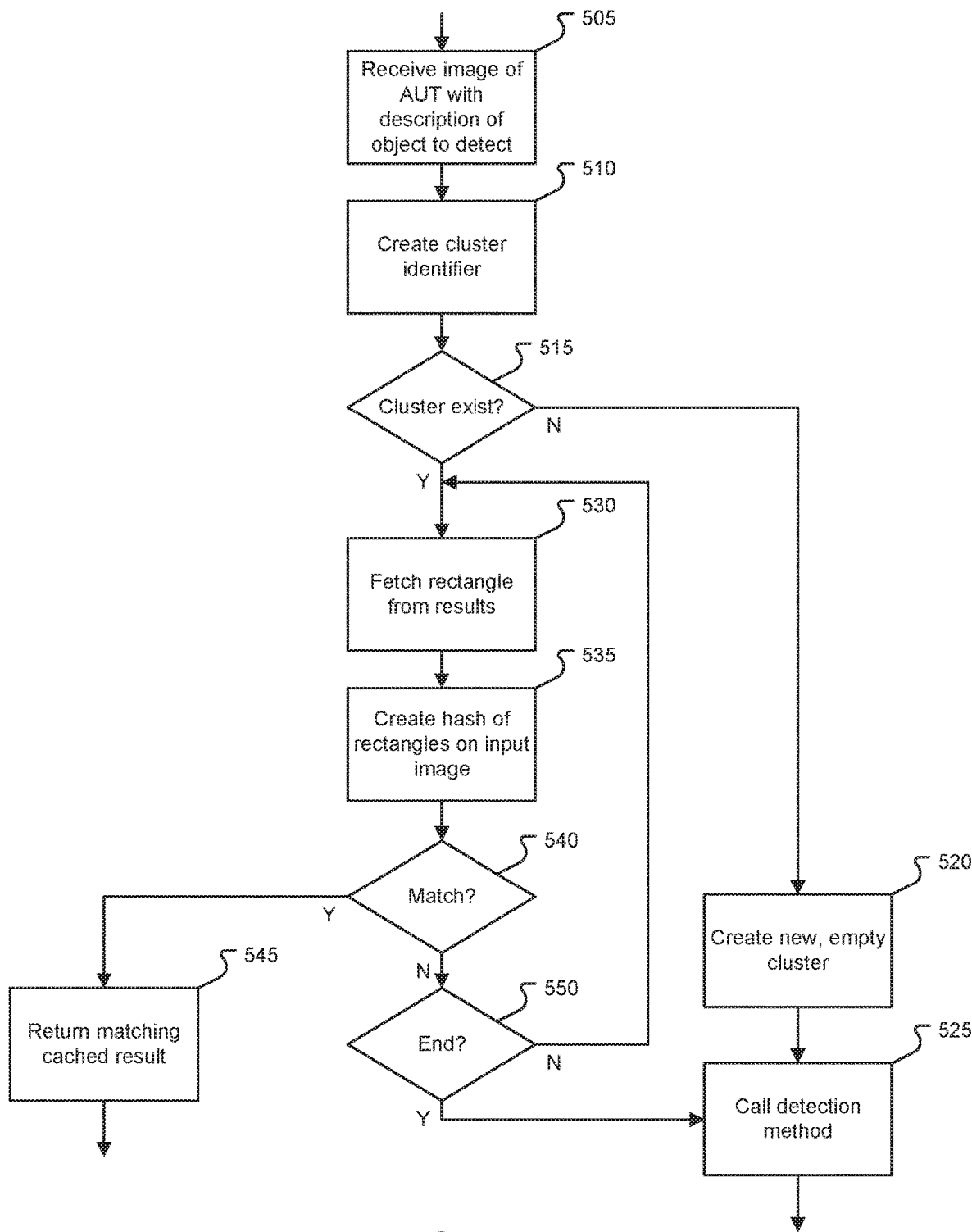
FIG. 5 is a flowchart illustrating an exemplary process for caching of elements of a user interface of an application under test according to one embodiment of the present disclosure.

FIG. 5 is a flowchart illustrating an exemplary process for caching of elements of a user interface 330 of an application under test according to one embodiment of the present disclosure. As described above, images of the user interface 330 of the AUT 325 can be cached in one or more clusters based on hashing of each image using a combination hash. The combination hash can comprise a hash of the image using a first hashing function and a hash of a description of the image using a second hashing functions. The description of the image can be hashed using the second hashing function. For example, the first level hash function can comprise a permissive hash function, i.e., a hash function that produces results in which matches between hashed data can be found when the data is less than an exact match, and the second level hash function can comprise a strict hash function, i.e., a hash function that produces results in which matches between hashed data can be found only when the data is an exact match or nearly exact match. The received image can be clustered with one or more clusters in a cache based on one or more areas of interest in the received image and a hash of each of the one or more areas of interest in the image using the second hashing function.

As illustrated in FIG. 5, executing the one or more tests on the AUT 325 can comprise receiving 505, by the processor of the edge computing device 315, an image of the user interface 330 of the AUT 325 with a description of an object to detect. A cluster identifier can be created 510 for the received image. The cluster identifier can comprise a hash of areas of interest in the received image using the second hash function, e.g., a strict hashing function. A determination 515 can then be made as to whether a matching cluster exist in the cache based on the cluster identifier. In response to determining 515 no matching cluster exists in the cache, a new, empty cluster can be created 520 and a detection method or routine can be called 525 to identify objects within the areas of interest in the image using the trained data of the model.

In response to determining 515 a matching cluster exists in the cache, a rectangle, i.e., an area of interest, can be fetched 530 from the received image and a hash of the rectangle can be created 535 using the second hashing function, e.g., the strict hashing function. A determination 540 can then be made as to whether a matching result exists in the matching cluster. In response to determining 540 a matching result exists in the matching cluster, the matching result can be returned 545.

In response to determining 540 no matching result exists in the matching cluster, a determination 550 can be made as to whether more rectangles, i.e., areas of interest, exist in the received image. In response to determining 550 more rectangles exist in the received image, processing can continue to fetch 530 rectangles from the received image, create a hash of the rectangle using the second hashing function 535, and determine 540 whether a matching result is found until either a match is found 540 and returned 545 or a determination 550 is made that all rectangles in the received image has been checked without finding a match in which case the detection method can be called 525.

Figure 6:
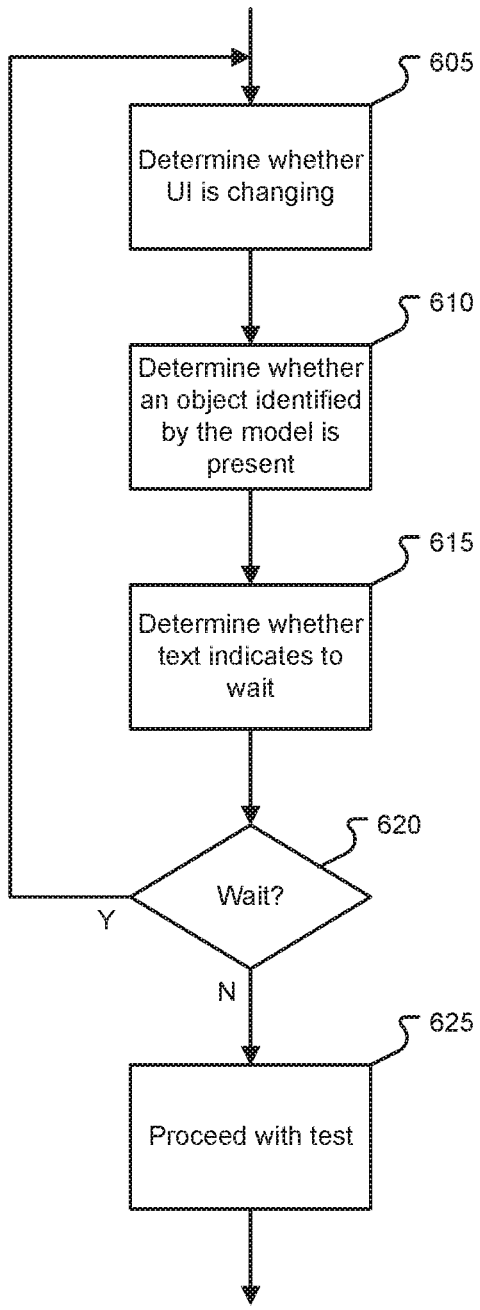
FIG. 6 is a flowchart illustrating an exemplary process for executing a test on an application according to one embodiment of the present disclosure.

FIG. 6 is a flowchart illustrating an exemplary process for executing a test on an application according to one embodiment of the present disclosure. As noted above, execution of a test on the AUT 325 may pause or wait in certain situations. Determining whether to pause or wait can be done in any one or more ways, individually or in combination. For example, executing the one or more tests on the AUT 325 can comprise any one or more of determining 605 whether the user interface 330 of the AUT 325 is currently changing, determining 610 whether an object identified by the model, i.e., one or more of a set of predefined and/or learned objects such as certain icons, a progress bar, etc., is present in the user interface 330 of the AUT 325 based on the trained data 344 of the model 340 identifying objects of the user interface 330 of the AUT 325, and/or determining 615 whether text of the user interface 330 of the AUT 325 indicates waiting, e.g., "Please wait . . . ", etc., based on the trained data 344 identifying texts of the user interface 330 of the AUT 325. A determination 620 can then be made as to whether to wait or pause execution of the test. In response to determining 620 to wait or pause execution of the test, e.g., any one or more of the user interface 330 currently changing, an object identified by the model 340 is present in the user interface 330, or text of the user interface 330 of the AUT 325 indicating waiting, processing can continue to check these conditions (605, 610, and 615) until a determination 620 is made to not wait, e.g., the user interface 330 is not currently changing, the object identified by the model(s) 340 are not present in the user interface 330, and text of the user interface 330 of the AUT 325 does not indicate waiting, at which point the test can proceed 625.

One advantage to the processes described herein is that the scripts 342 can be automatically generated and executed in real-time using AI, which does not require any user intervention. This process dramatically improves the testing of the AUT 325 in ways that cannot be realized through manual processes. The end result is an overall improvement of the testing time and computer resources required to test the AUT 325.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing functional testing on an Application Under Test (AUT), the method comprising:
    maintaining, by a processor of an edge computing device, an Artificial Intelligence (AI)-based model comprising a script defining one or more automatic tests for the AUT and trained data identifying objects of a user interface of the AUT based on a graphical appearance of each identified object;
    executing, by the processor of the edge computing device, the one or more automatic tests on the AUT based on the script and the trained data identifying the objects of the user interface of the AUT based on the graphical appearance of each identified object, wherein executing the one or more automatic tests on the AUT comprises performing a two-level caching process on the user interface of the AUT, the two-level caching process based on a hash of an image of the user interface of the AUT, a hash of a description of the image, and a hash of one or more areas of interest in the image, and wherein the two-level caching process comprises receiving the image of the user interface of the AUT, hashing the received image using a combination hash, the combination hash comprising a hash of the image using a permissive hashing function producing results in which matches between hashed data are found when the data is less than an exact match and a hash of the description of the image using a strict hashing function producing results in which matches between hashed data are found when the data is an exact match, hashing each of the one or more areas of interest in the received image using the strict hashing function, and clustering the received image with one or more clusters in a cache based on the hash of each of the one or more areas of interest in the image using the second hashing function; and
    providing, by the processor of the edge computing device, results of executing the one or more automatic tests on the AUT.

2. The method of claim 1, further comprising updating, by the processor of the edge computing device, the model based on the results of executing the one or more automatic tests on the AUT.

3. The method of claim 1, wherein executing the one or more automatic tests on the AUT comprises:
    determining, by the processor of the edge computing device, whether the user interface of the AUT is currently changing; and
    in response to determining the user interface of the AUT is currently changing, waiting, by the processor of the edge computing device, before proceeding with execution of the one or more automatic tests on the AUT; and
    in response to determining the user interface of the AUT is not currently changing, proceeding, by the processor of the edge computing device, with execution of the one or more automatic tests on the AUT.

4. The method of claim 1, wherein executing the one or more automatic tests on the AUT comprises:
    determining, by the processor of the edge computing device, whether an object identified by the model is present in the user interface of the AUT based on the trained data identifying objects of the user interface of the AUT; and
    in response to determining the object identified by the model is present in the user interface of the AUT, waiting, by the processor of the edge computing device, before proceeding with execution of the one or more automatic tests on the AUT; and in response to determining the object identified by the model is not present in the user interface of the AUT, proceeding, by the processor of the edge computing device, with execution of the one or more automatic tests on the AUT.

5. The method of claim 1, wherein executing the one or more automatic tests on the AUT comprises:

determining, by the processor of the edge computing device, whether text of the user interface of the AUT indicates waiting based on the trained data identifying objects of the user interface of the AUT; and in response to determining the text of the user interface of the AUT indicates waiting, waiting, by the processor of the edge computing device, before proceeding with execution of the one or more automatic tests on the AUT; and in response to determining the text of the user interface of the AUT does not indicate waiting, proceeding, by the processor of the edge computing device, with execution of the one or more automatic tests on the AUT.

6. The method of claim 1, wherein maintaining the model comprises training the trained data using a development mock-up of the user interface of the AUT.

7. A computing device comprising:

a processor; and a memory coupled with and readable by the processor and storing therein a set of instructions which, when executed by the processor, causes the processor to perform functional testing on an Application Under Test (AUT) by:

maintaining an Artificial Intelligence (AI)-based model comprising a script defining one or more automatic tests for the AUT and trained data identifying objects of a user interface of the AUT based on a graphical appearance of each identified object;

executing the one or more automatic tests on the AUT based on the script and the trained data identifying the objects of the user interface of the AUT based on the graphical appearance of each identified object, wherein executing the one or more automatic tests on the AUT comprises performing a two-level caching process on the user interface of the AUT, the two-level caching process based on a hash of an image of the user interface of the AUT, a hash of a description of the image, and a hash of one or more areas of interest in the image, and wherein the two-level caching process comprises receiving the image of the user interface of the AUT, hashing the received image using a combination hash, the combination hash comprising a hash of the image using a permissive hashing function producing results in which matches between hashed data are found when the data is less than an exact match and a hash of the description of the image using a strict hashing function producing results in which matches between hashed data are found when the data is an exact match, hashing each of the one or more areas of interest in the received image using the strict hashing function, and clustering the received image with one or more clusters in a cache based on the hash of each of the one or more areas of interest in the image using the second hashing function; and providing results of executing the one or more automatic tests on the AUT.

8. The computing device of claim 7, wherein the instructions further cause the processor to update the model based on the results of executing the one or more automatic tests on the AUT.

9. The computing device of claim 7, wherein executing the one or more automatic tests on the AUT comprises:

determining whether the user interface of the AUT is currently changing; and in response to determining the user interface of the AUT is currently changing, waiting before proceeding with execution of the one or more automatic tests on the AUT; and in response to determining the user interface of the AUT is not currently changing, proceeding with execution of the one or more automatic tests on the AUT.

10. The computing device of claim 7, wherein executing the one or more automatic tests on the AUT comprises:

determining, whether an object identified by the model is present in the user interface of the AUT based on the trained data identifying objects of the user interface of the AUT; and in response to determining the object identified by the model is present in the user interface of the AUT, waiting before proceeding with execution of the one or more automatic tests on the AUT; and in response to determining the object identified by the model is not present in the user interface of the AUT, proceeding with execution of the one or more automatic tests on the AUT.

11. The computing device of claim 7, wherein executing the one or more automatic tests on the AUT comprises:

determining whether text of the user interface of the AUT indicates waiting based on the trained data identifying objects of the user interface of the AUT; and in response to determining the text of the user interface of the AUT indicates waiting, waiting before proceeding with execution of the one or more automatic tests on the AUT; and in response to determining the text of the user interface of the AUT does not indicate waiting, proceeding with execution of the one or more automatic tests on the AUT.

12. The computing device of claim 7, wherein maintaining the model comprises training the trained data using a development mock-up of the user interface of the AUT.

13. A non-transitory, computer-readable medium comprising a set of instructions stored therein which, when executed by a processor, causes the processor to perform functional testing on an Application Under Test (AUT) by:

maintaining an Artificial Intelligence (AI)-based model comprising a script defining one or more automatic tests for the AUT and trained data identifying objects of a user interface of the AUT based on a graphical appearance of each identified object;

executing the one or more automatic tests on the AUT based on the script and the trained data identifying the objects of the user interface of the AUT based on a graphical appearance of each identified object, wherein executing the one or more automatic tests on the AUT comprises performing a two-level caching process on the user interface of the AUT, the two-level caching process based on a hash of an image of the user interface of the AUT, a hash of a description of the image, and a hash of one or more areas of interest in the image, and wherein the two-level caching process comprises receiving the image of the user interface of the AUT, hashing the received image using a combination hash, the combination hash comprising a hash of the image using a permissive hashing function producing results in which matches between hashed data are found when the data is less than an exact match and a hash of the description of the image using a strict hashing function producing results in which matches between hashed data are found when the data is an exact match, hashing each of the one or more areas of interest in the received image using the strict hashing function, and clustering the received image with one or more clusters in a cache based on the hash of each of the one or more areas of interest in the image using the second hashing function; and providing results of executing the one or more automatic tests on the AUT.

14. The non-transitory, computer-readable medium of claim 13, wherein the instructions further cause the processor to update the model based on the results of executing the one or more automatic tests on the AUT.

15. The non-transitory, computer-readable medium of claim 13, wherein executing the one or more automatic tests on the AUT comprises:
   determining whether the user interface of the AUT is currently changing; and
   in response to determining the user interface of the AUT is currently changing, waiting before proceeding with execution of the one or more automatic tests on the AUT; and
   in response to determining the user interface of the AUT is not currently changing, proceeding with execution of the one or more automatic tests on the AUT.

16. The non-transitory, computer-readable medium of claim 13, wherein executing the one or more automatic tests on the AUT comprises:
   determining, whether an object identified by the model is present in the user interface of the AUT based on the trained data identifying objects of the user interface of the AUT; and
   in response to determining the object identified by the model is present in the user interface of the AUT, waiting before proceeding with execution of the one or more automatic tests on the AUT; and
   in response to determining the object identified by the model is not present in the user interface of the AUT, proceeding with execution of the one or more automatic tests on the AUT.

17. The non-transitory, computer-readable medium of claim 13, wherein executing the one or more automatic tests on the AUT comprises:
   determining whether text of the user interface of the AUT indicates waiting based on the trained data identifying objects of the user interface of the AUT; and
   in response to determining the text of the user interface of the AUT indicates waiting, waiting before proceeding with execution of the one or more automatic tests on the AUT; and
   in response to determining the text of the user interface of the AUT does not indicate waiting, proceeding with execution of the one or more automatic tests on the AUT.

\* \* \* \* \*